(12) United States Patent  
Bacon

(10) Patent No.: US 9,121,433 B1  
(45) Date of Patent: Sep. 1, 2015

(54) JOINING ELEMENTS FOR CHANNELLED STRUCTURAL MEMBERS

(71) Applicant: Hilton Raymond Bacon, Tai Po (HK)

(72) Inventor: Hilton Raymond Bacon, Tai Po (HK)

( * ) Notice: Subject to any disclaimer, the term of this patent is extended or adjusted under 35 U.S.C. 154(b) by 0 days.

(21) Appl. No.: 14/222,563

(22) Filed: Mar. 21, 2014

(51) Int. Cl.
*F16B 17/00* (2006.01)
*F16B 37/04* (2006.01)

(52) U.S. Cl.
CPC .................................. *F16B 37/045* (2013.01)

(58) Field of Classification Search
CPC .. A47B 47/0008; A47B 17/0016; E04B 1/19; E04B 1/1912; E04B 1/2403; E04B 1/5831; E04B 1/5837; F16B 17/00; F16B 12/32; F16B 7/04; F16B 7/18; F16B 7/0446
USPC ................. 403/21, 169–172, 176; 312/265.1, 312/265.4; 211/182
See application file for complete search history.

(56) References Cited

U.S. PATENT DOCUMENTS

| | | | | |
|---|---|---|---|---|
| 2,345,650 A * | 4/1944 | Attwood | ........................ | 403/21 |
| 3,357,727 A * | 12/1967 | Finkenstein et al. | .......... | 403/176 |
| 3,532,369 A * | 10/1970 | Reilly | ........................... | 403/176 |
| 3,666,298 A * | 5/1972 | Reilly | ........................... | 403/172 |
| 3,858,989 A * | 1/1975 | Field | ............................. | 403/171 |
| 3,977,800 A * | 8/1976 | Cassel | ........................... | 403/172 |
| 4,111,577 A * | 9/1978 | Kiyosawa | ..................... | 403/172 |
| 4,770,560 A * | 9/1988 | Ott | .................................. | 403/296 |
| 4,954,007 A * | 9/1990 | Pinney | ......................... | 403/172 |
| 5,066,161 A * | 11/1991 | Pinney | ......................... | 403/172 |
| 5,605,410 A * | 2/1997 | Pantev | ......................... | 403/297 |
| 5,904,437 A * | 5/1999 | Allen | ............................ | 403/170 |
| 6,062,761 A * | 5/2000 | Allen | ............................ | 403/170 |
| 6,874,971 B2 * | 4/2005 | Albaugh | ...................... | 403/297 |
| 2008/0229699 A1 * | 9/2008 | Nehls | ........................... | 52/653.1 |

* cited by examiner

*Primary Examiner* — Daniel Wiley

(57) ABSTRACT

A joining element for square U-Shaped channelled structural members that have formed longitudinal ribs and an open slot. The joining element comprises a central body having one or more cruciform shaped protrusions. Each protrusion has a plurality of landing surfaces that engage with the channelled structural member so that when a protrusion is inserted into the end of the channelled structural member the landing surfaces of the protrusions positioned inside the arms of the crucifix protrusion, engage the free edges of the longitudinal ribs making a snug fit. The plurality of landing surfaces allows the channelled structural members to be independently rotated so that the open slot formed by the longitudinal ribs is oriented in the desired direction.

7 Claims, 2 Drawing Sheets

JOINING ELEMENTS FOR CHANNELLED STRUCTURAL MEMBERS

CROSS-REFERENCE TO RELATED APPLICATIONS

This disclosure incorporates and has the priority of the U.S. Provisional Patent Application Ser. No. 61/811,742, filed Apr. 14, 2013 entitled, A JOINING ELEMENT FOR CHANNELLED STRUCTURAL MEMBERS.

STATEMENT REGARDING FEDERALLY SPONSORED RESEARCH OR DEVELOPMENT

Not Applicable.

THE NAMES OF THE PARTIES TO A RESEARCH AGREEMENT

Not Applicable.

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

1. Field of the Invention

The invention relates generally to connectors and more in particularly to innovative connections that have unique cruciform protrusions with sets of landing surfaces for joining the ends of channelled structural members.

Channelled structural members invented by Attwood in 1940 have become one of the most popular channelled structural members in the construction industry. It is used for scaffolding, space frames, stage construction, platforms, and kiosks and is available in every country of the World.

Channelled structural members comprise of a square sheet metal member of a substantially U-section and has side webs. A connecting base web is provided at the open side of the channel with inwardly extending flanges and downwardly turned portions forming longitudinal ribs. The longitudinal ribs have free edges that engage with the landing surfaces of the invention and define the open slot in the channelled structural member.

The prior art method of joining channelled structural members together is with steel plates, spring nuts and bolts; described in U.S. Pat. No. 2,345,650 to Attwood. (Oct. 12, 1940). The prior art method for joining channelled structural members with bolts and steel plates is visible and crude in appearance. It is this lack of sophistication in appearance of such prior art joining methods that has restricted the use of channelled structural members to industrial and construction sites, where appearances are of no concern.

2. Description of Related Art

The prior art method of joining channelled structural members is with exposed flat steel plates and bolts, This method of joining fittings can catch clothing or other objects that may come into contact with the raw edges of the flat plates.

Another weakness in prior art joining methods is with using flat plates and spring nuts to support heavy loads. There is a danger of the flat plates sliding off the channelled structural member, particularly if the load is relatively heavy or subjected to vibration. Supplemental fastening is required to ensure heavy vertical loads are adequately and safely secured in position.

A further disadvantage with prior art flat steel plates for joining channelled structural members is that they all are made with 14 mm diameter bolt holes; a case of one size fits all. This bolt clearance is excessive for smaller diameter bolts and may fail to provide a sufficiently rigid connection. Additional work is required for squaring joints and aligning channelled structural members.

Another disadvantage of the prior art joining designs is by the use of flat plates which creates crevices and gaps around the joining assembly. Where the prior art flat plates contact the rounded bends of the channelled structural member, gaps are formed that can harbour dirt and bacteria. The difficulty is to keep the joining area clean, especially in food processing, medical and pharmaceutical production plants. The prior art joining design restricts the use of channelled structural members in such clean environment.

Another prior art method of joining channelled structural members is by electric arc welding.

BRIEF SUMMARY OF THE INVENTION

Accordingly, it is an object of the invention to join channelled structural members with longitudinal ribs, to each other with fittings which give the join an improved aesthetic appearance and allows channelled structural members to be used for the assembly of display showcases, commercial framework and other unified structures, where the finished appearance is important and pleasing to the eye.

The main embodiment of the invention allows the joining of the end of a channelled structural member with innovative cruciform protrusions that have sets of landing surfaces positioned inside the arms of the crucifix protrusion. The landing surfaces of the cruciform protrusion allows each channelled structural member to be independently rotated in four 90 degree increments, This unique feature allows the orientation of the open slots to be positioned as desired.

The geometry of the cruciform protrusion together with a snug fit into the end of the channelled members allows member to be readily attached with each join having an inherent stability once assembled. The self-aligning nature of the cruciform protrusions and the edges of the longitudinal ribs with the landing surfaces of the invention make assembly quick and eliminate time ordinarily taken in squaring joints and aligning the structural members.

Figure 1:
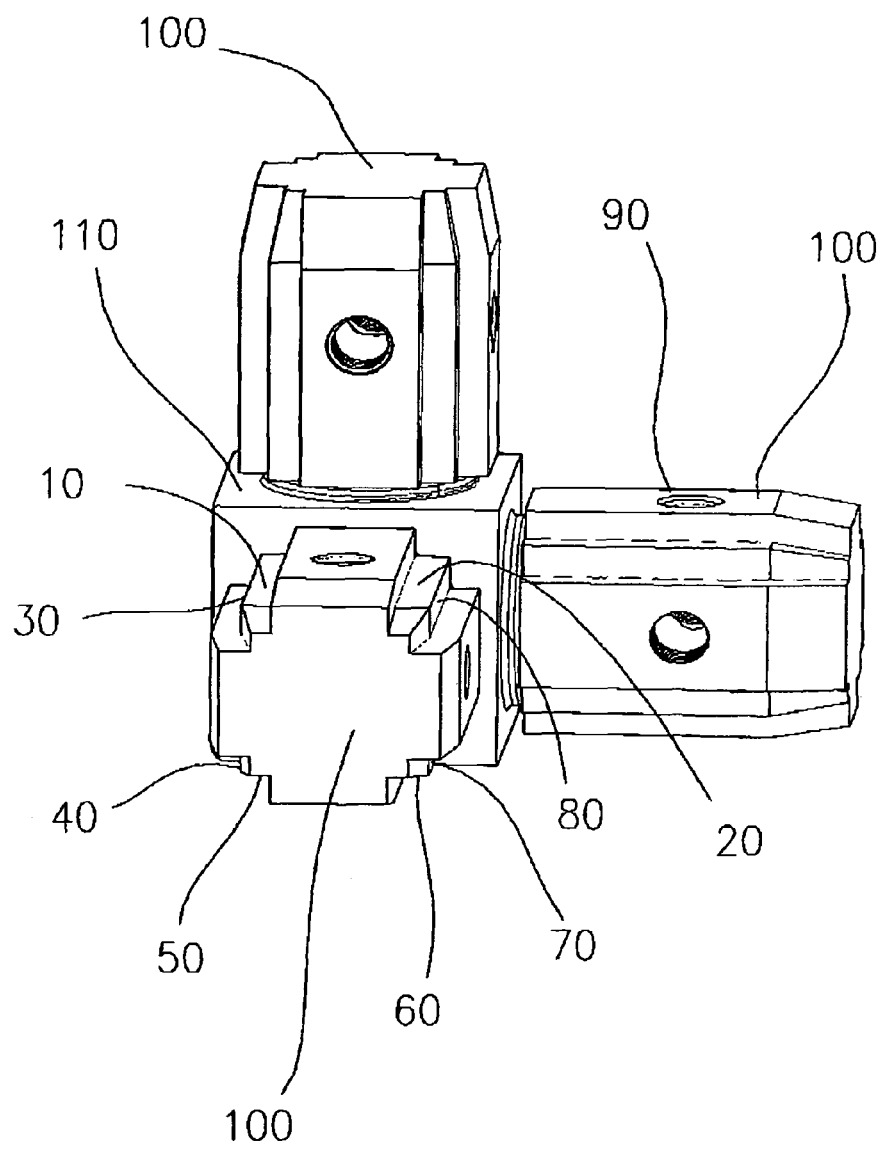
FIG. 1 is a view of the invention in the form of a corner fitting.

Gazette Drawing. Is a view of the invention in the form of a top corner fitting.

GLOSSARY OF DRAWING REFERENCES

10 left hand top landing surface of cruciform protrusion
20 right hand top landing surface of cruciform protrusion 30 left upper side landing surface of cruciform protrusion
40 left lower side landing surface of cruciform protrusion
50 left bottom landing surface of cruciform protrusion
60 right bottom landing surface of cruciform protrusion
70 right upper side landing surface of cruciform protrusion
80 right lower side landing surface of cruciform protrusion
90 tapped screw threads
100 cruciform protrusion with sets of landing surfaces.
110 central body
120 open slot
130 top flange surface
140 top flange surface
160 strut base
170 side web
180 side web
200 channelled structural member
210 channelled structural member, partly withdrawn
220 free edge of longitudinal ribs
230 free edge of longitudinal ribs
240 longitudinal rib of channelled structural member
250 longitudinal rib of channelled structural member
270 grub screw

DETAILED DESCRIPTION OF THE INVENTION

The nature of the present invention will be readily understood by referring to an exemplary form of the invention as a corner fitting.

FIG. 1. Shows a cruciform protrusion 100 as a corner fitting with three cruciform protrusions formed with a central body 110 each cruciform protrusion has four sets of landing surfaces arrayed around the longitudinal axis of each protrusion and positioned inside the arms of the crucifix. Sets of landing surfaces 10 and 20, 30 and 40, 50 and 60 with 70 and 80, allows a channelled structural member 200 to be rotated in four 90° increments around the longitudinal axis of the protrusion. Tapped screw thread 90 allows screws to be used to lock the invention and the channelled structural member together by urging the free edges of the longitudinal ribs of the channelled structural member into a rigid fixed relationship with the landing surfaces of the protrusion.

Figure 2:
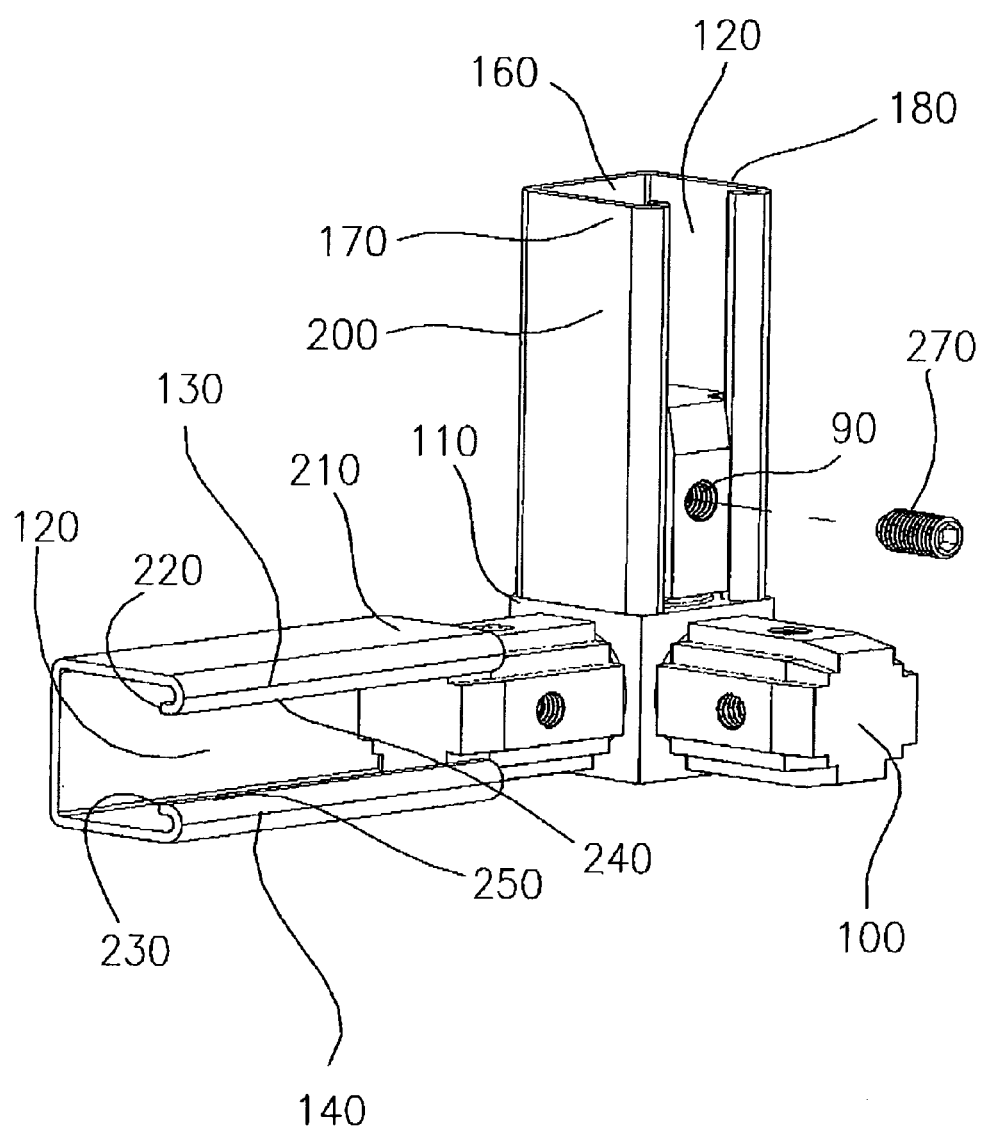
FIG. 2 is a perspective view of a corner fitting with sections of channelled structural members and fixing screw.

FIG. 2 Shows a corner fitting with channelled structural members 200 and 210, Channelled structural members 200 and 210 are comprise of a square sheet metal substantially U-section and a strut base 160 with side webs 170 and 180. A connecting base web is provided at the open side of the channel with inwardly extending flanges and downwardly turned portions forming longitudinal ribs 240 and 250, the longitudinal ribs have free edges 220 and 230 that engage with the landing surfaces and define the open slot 120 in the channelled structural member. Channelled structural member 210 is partly withdrawn from the protrusion to show engagement of the free edges of its longitudinal ribs with the landing surfaces positioned inside the arms of the cruciform protrusion. Channelled structural member 200 is fastened together with the corner fitting by a grub screw 270, Tightening the grub screw urges the edges of the longitudinal ribs of the channelled structural members into a rigid fixed relationship with the landing surfaces of the protrusion. The point of the grub screw bites into the strut base and the pull-out strength of the joint are increased by this cutting action of the point.

The main embodiment of the invention has been shown and described that a joining element comprises of a central body with integral cruciform shaped protrusions with landing surfaces positioned inside the arms of the cruciform projection, that engages the free edges of the with longitudinal ribs of the channelled structural members, described in U.S. Pat. No. 2,345,650 to Attwood. This is the first new method of joining channelled structural members together to form unified structures since Attwood invented the channelled structural member on Oct. 12, 1940.

It will be obvious to those skilled in the art that various changes and modifications may be made therein without departing from the scope of the invention as defined by the appended claims.

What is claimed is:

1. A joining element connecting one or more elongate structural members, wherein a cross-sectional profile of each structural member comprises a base wall and adjoining side walls extending from, and perpendicular to, opposing ends of the base wall, each side wall comprising an inwardly-turned rib at an end distal to the base wall, such that a channel is formed between said ribs, the joining element comprising:
  a central body comprising:
    at least one elongate, cruciform projection insertable into a longitudinal end of a respective structural member, each cruciform projection comprising:
      a hollow center portion,
      four orthogonally disposed, longitudinally extending protrusions arranged about a periphery thereof, each protrusion having a width substantially equal to a width of the channel,
      four landing surfaces, each landing surface disposed between a pair of adjacent protrusions, wherein a distance between adjacent landing surfaces is greater than the width of the channel, and
      at least one threaded hole extending from a periphery of one of said protrusions and extending radially through to the hollow center portion; and
    at least one grub screw configured to extend through the at least one threaded hole and engage with a base wall of a structural member;
  wherein when the grub screw is engaged with the base wall, the structural member is moved so that the ribs of the structural member are moved into engagement with a pair of adjacent landing surfaces opposite the base wall, so as to lock the joining element to the structural member.

2. The joining element of claim 1, wherein the central body comprises a plurality of cruciform projections, so as to form a tee, a cross, a 4-way element, a 5-way element, or a 6-way element.

3. The joining element of claim 1, wherein corners of the joining element comprise step blocks with threaded screw holes to allow covers and panels to be attached thereto.

4. The joining element of claim 1, wherein each corner of the joining element comprises a fillet.

5. The joining element of claim 1, wherein the at least one cruciform projection comprises a countersunk clearance hole with a fixing screw for a spring nut fastener.

6. The joining element of claim 1, wherein the landing surfaces are flat or include teeth.

7. The joining element of claim 1, wherein the at least one cruciform projection is cast with a central body as an angular fitting.

* * * * *